US 6,717,284 B2

(12) United States Patent
Lin

(10) Patent No.: US 6,717,284 B2
(45) Date of Patent: Apr. 6, 2004

(54) POWER GENERATING MACHINE WITH A BELLOWS ADAPTABLE TO SEA WAVES SO AS TO DRIVE A GENERATOR

(76) Inventor: Ming-Hung Lin, 3F, No. 2, Lane 429, Fu-Chin Street, Taipei City (TW)

( * ) Notice: Subject to any disclaimer, the term of this patent is extended or adjusted under 35 U.S.C. 154(b) by 79 days.

(21) Appl. No.: 10/151,963

(22) Filed: May 22, 2002

(65) Prior Publication Data
US 2003/0218337 A1 Nov. 27, 2003

(51) Int. Cl.[7] .............................................. F03B 13/12
(52) U.S. Cl. ........................... 290/53; 290/42; 60/495; 417/330
(58) Field of Search ............................. 290/42, 43, 53, 290/54; 60/495, 497; 417/330, 331

(56) References Cited
U.S. PATENT DOCUMENTS

| | | | | |
|---|---|---|---|---|
| 3,952,517 A | * | 4/1976 | Decker | 60/502 |
| 4,441,316 A | * | 4/1984 | Moody | 60/398 |
| 4,883,411 A | * | 11/1989 | Windle | 417/331 |
| 5,244,359 A | * | 9/1993 | Slonim | 417/332 |
| 5,329,497 A | * | 7/1994 | Previsic et al. | 367/141 |
| 5,340,283 A | * | 8/1994 | Nagata | 417/118 |
| 5,426,332 A | * | 6/1995 | Ullman et al. | 290/53 |
| 5,842,838 A | * | 12/1998 | Berg | 417/331 |
| 5,872,406 A | * | 2/1999 | Ullman et al. | 290/53 |

* cited by examiner

Primary Examiner—Nicholas Ponomarenko
(74) Attorney, Agent, or Firm—Dennison, Schultz, Dougherty & MacDonald

(57) ABSTRACT

A power generating machine having a frame provided with a first support, a second support and a third support laterally and adjustably mounted between the first and second supports. A bellows is mounted under the third support and between the first and second supports. The bellows has a buoy mounted at a bottom of the bellows to adapt to be flush with sea level so that sea waves are able to drive the bellows to move up and down reciprocally. A first tube is mounted to communicate with the first tube and so as to allow air to be sucked in the first tube when the bellows extend. A second tube is communicated with the first tube so as to allow air flowing only to a tank connected to and communicating with the second tube to drive a pneumatic generator to generate electricity.

11 Claims, 6 Drawing Sheets

POWER GENERATING MACHINE WITH A BELLOWS ADAPTABLE TO SEA WAVES SO AS TO DRIVE A GENERATOR

BACKGROUND OF THE INVENTION

1. Field of the Invention

The present invention relates to a power generating machine, and more particularly to a power generating machine with a bellows adaptable to sea waves. The bellows is able to reciprocally move back and forth so as to build up air pressure in a tank and therefore the air pressure is able to drive a generator to generate electricity.

2. Description of Related Art

Numerous methods have been introduced to generate electricity via the difference between tides. Due to the difference between tides, a buoy is forced to move up and down. With the up and down movement of the buoy, the fluid in a hydraulic tank is forced to drive the blades on one end of the generator. This kind of machine is complicated and therefore maintenance thereof is very time consuming and labor inefficient. Furthermore, because the tides are not always stable so that if the tides are too weak, the buoyancy to the buoy will not be strong enough to force the piston in the hydraulic tank to move. Moreover, if the tides are too high, the buoy will be maintained at a position where the piston will not be functioned normally.

To overcome the shortcomings, the present invention intends to provide an improved power generating machine to mitigate or obviate the aforementioned problems.

SUMMARY OF THE INVENTION

The primary objective of the invention is to provide a power generating machine with a bellows adaptable to sea waves. The bellows has a buoy mounted at a bottom of the bellows so that the bellows is able to reciprocally move along the waves. Along the movement of the bellows, air pressure is gradually built up in a hydraulic tank so that a generator is eventually driven by the air pressure in the hydraulic tank to generate electricity.

Another objective of the invention is to provide an improved power generating machine with a second buoy mounted beside the buoy on the bottom of the bellows. The second buoy is heavier than that of the buoy so that the bellows is able to be driven by the waves due to the buoyancy to the buoy.

Still, another objective of the invention is to provide an improved power generating machine having a boat mounted between the two bellows so that the bellows is able to be driven by the waves due to the buoyancy to the buoy.

Other objects, advantages and novel features of the invention will become more apparent from the following detailed description when taken in conjunction with the accompanying drawings.

DETAILED DESCRIPTION OF PREFERRED EMBODIMENT

Figure 1:
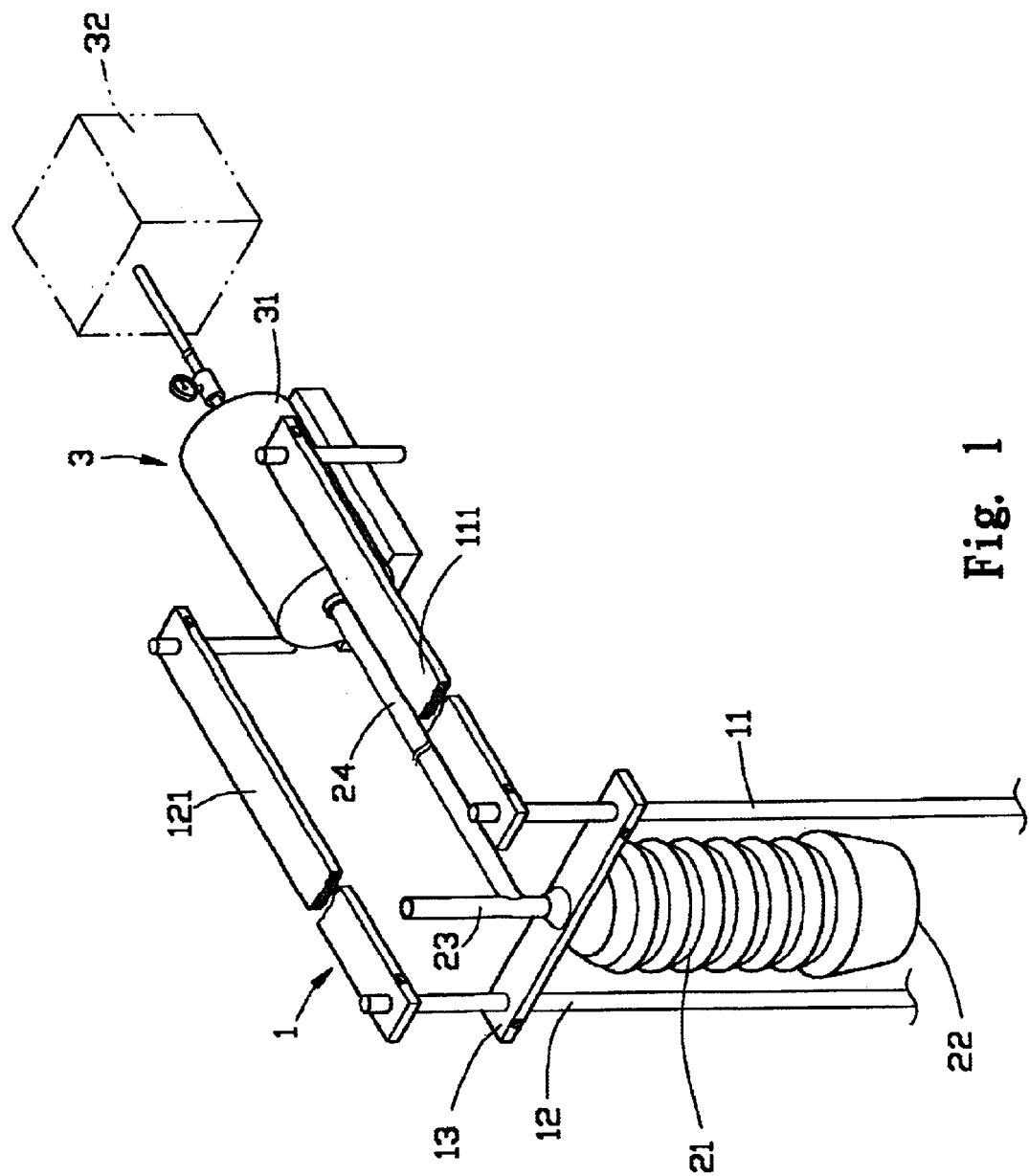
FIG. 1 is a perspective view of the power generating machine of the present invention.

With reference to FIG. 1, the power generating machine constructed in accordance with the present invention has a frame 1 provided with a first support 11, a second support 12 and a third support 13 laterally and adjustably mounted between the first and second supports 11,12. A first reinforced arm 111 securely extends from one distal end of the first support 11 and is vertical to the first support 11 and a second reinforced arm 121 securely extends from one distal end of the second support 12 and is vertical to the second support 12 to strengthen the rigid of the frame 1.

A bellows 21 is mounted under the third support 13 and between the first and second supports 11,12 and has a first buoy 22 mounted at a bottom of the bellows 21. The bottom of the first buoy 22 is flush with the sea level. A first tube 23 is mounted on top of the bellows 21 and communicates with the interior of the bellows 21. A second tube 24 connected to the first tube 23 and selectively communicates with the first tube 23. The first tube 23 has a first unidirectional valve 231 and the second tube 24 has a second unidirectional valve 241, as shown in FIG. 2.

A power generating device 3 has a tank 31 connected to the second tube 24 and a pneumatic generator 32 connected to the tank 21.

A spring 211 may be optionally provided inside the bellows 21 so as to provide a recoil force to the bellows 21 to assist the bellows 21 to return to its original position.

Figure 2:
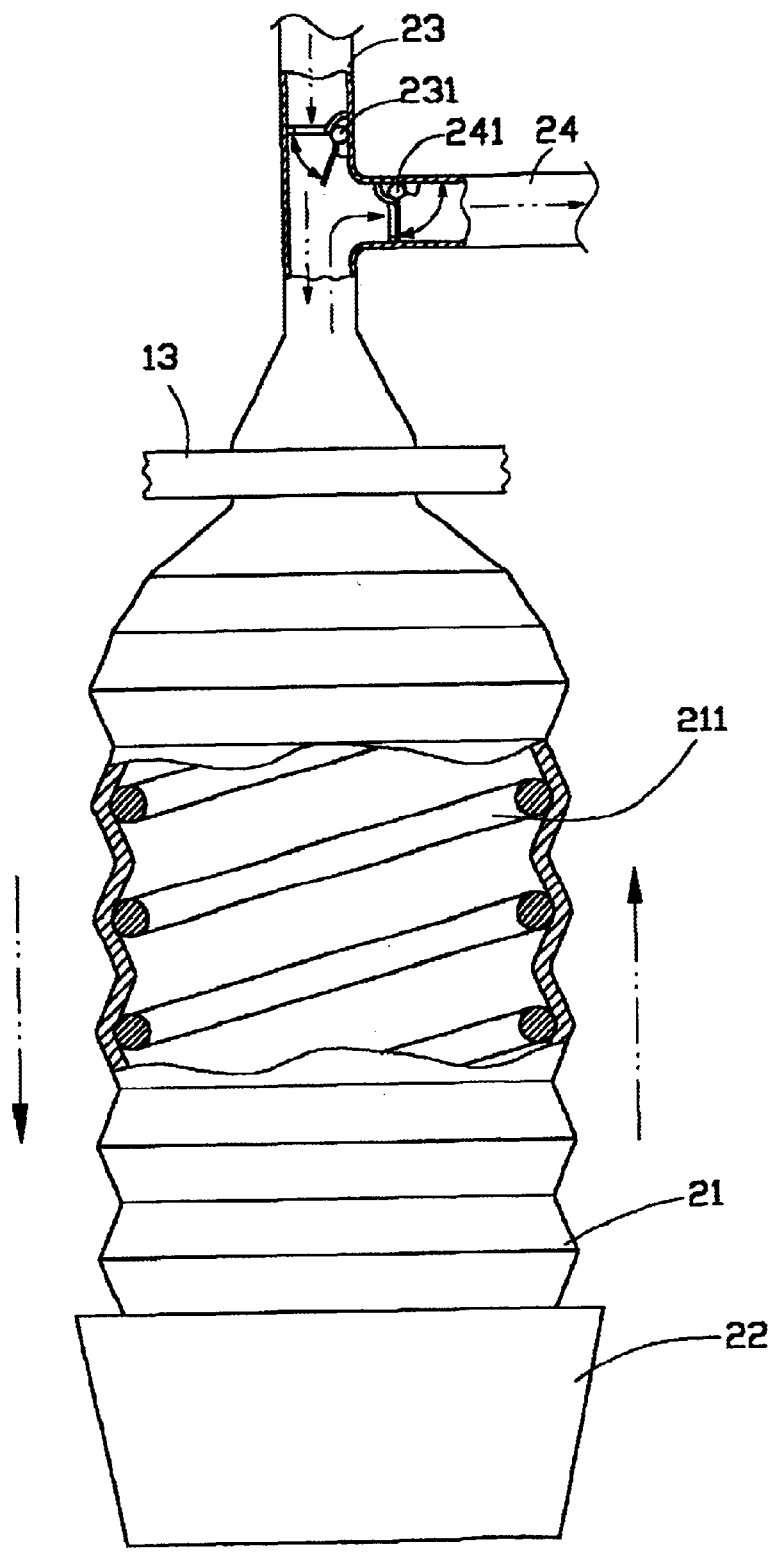
FIG. 2 is a side view of the bellows with partial in cross section showing the function of the bellows in relation to the tubes.
Figure 3:
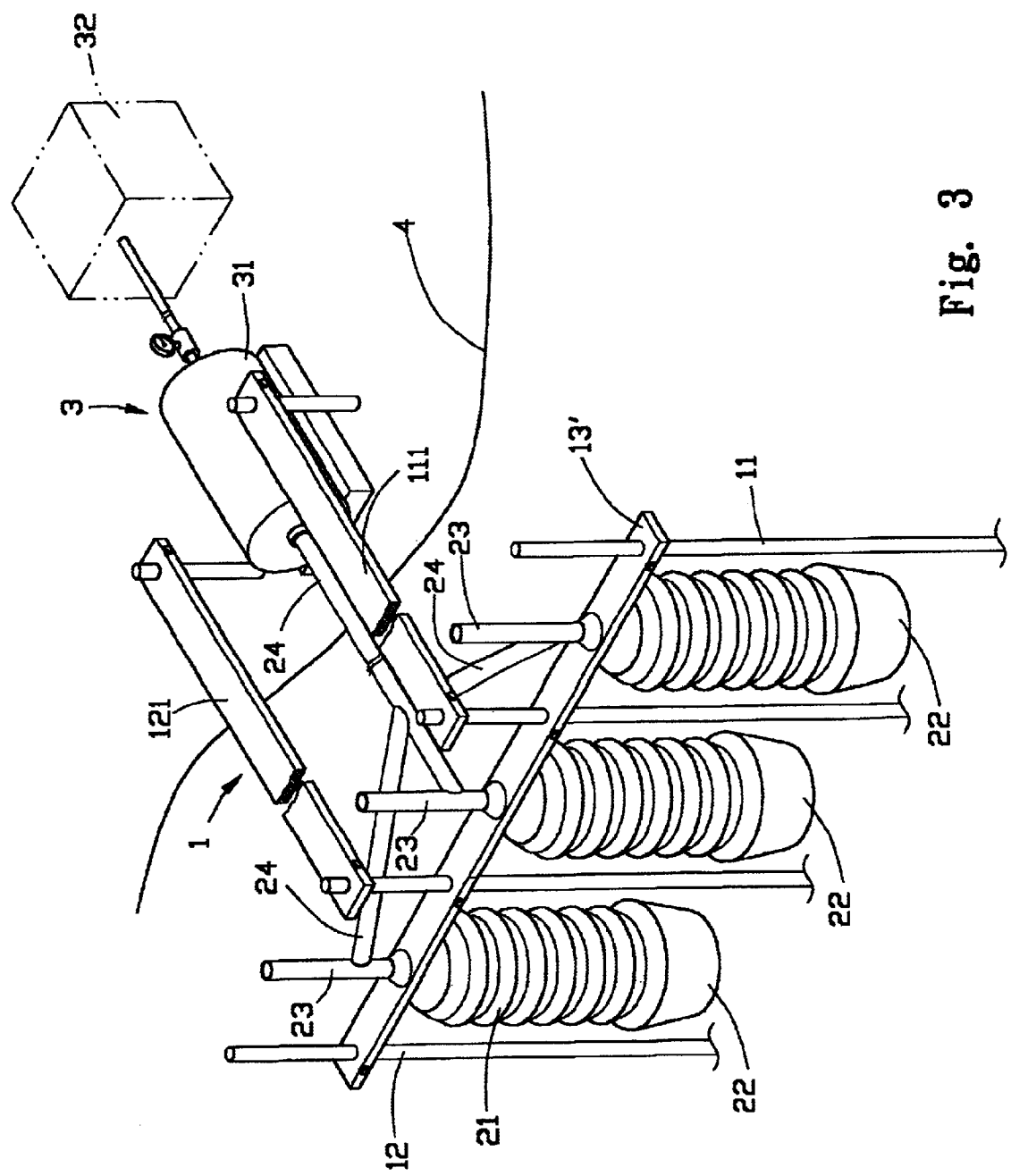
FIG. 3 is a schematic view showing the application of the power generating machine of the present invention.

With reference to FIG. 3 and still taking FIGS. 1 and 2 for reference, when the power generating device of the present invention is in use, the first and second supports 11,12 are first securely mounted on an appropriate position in the bed of the coast 4. The first and second reinforced arms 111,121 extend ashore and are then secured on the ground to stabilize the frame 1. The third support 13 is adjusted so that the buoy 22 is flush with the sea level and then the buoy 22 is able to move along the sea wave.

When the bellows 21 moves, the first tube 23 is able to such air from the atmosphere. Because of the first unidirectional valve 231 and the second unidirectional valve 241 in the first and the second tubes 23, 24 respectively, the air in the bellows 21 will be pushed to flow to the second tube 24 and then stored in the tank 31 due to the compression of the bellows 21 and the spring 211. That is, when the buoy 22 is pushed by the sea wave and the bellows 21 as well as the spring 211 is compressed, the air in the first tube 23 is pushed to flow to the second tube 24 due to the close of the first unidirectional valve 231. Because the air flow toward the second tube 24, the second unidirectional valve 241 is pushed to open by the air flow. Because the second tube 24 and the tank 31 communicate with each other so that when the air is in the second tube 24 and the air pressure is gradually built up in the tank 31, the second unidirectional valve 241 is forced by the air pressure to close. As the bellows 21 starts to extend, the first unidirectional valve 231 is open again so as to start another cycle. With such an arrangement, the air pressure is stored in the tank 31 and thus the pneumatic generator 32 is able to be driven to generate electricity. From the embodiment shown in FIG. 3, the third support 13' is able to extend as required such that the frame 1 is able to expand to have multiple sets of first and second supports 11,12 and thus bellows 21 as well as the buoys 22.

Figure 4:
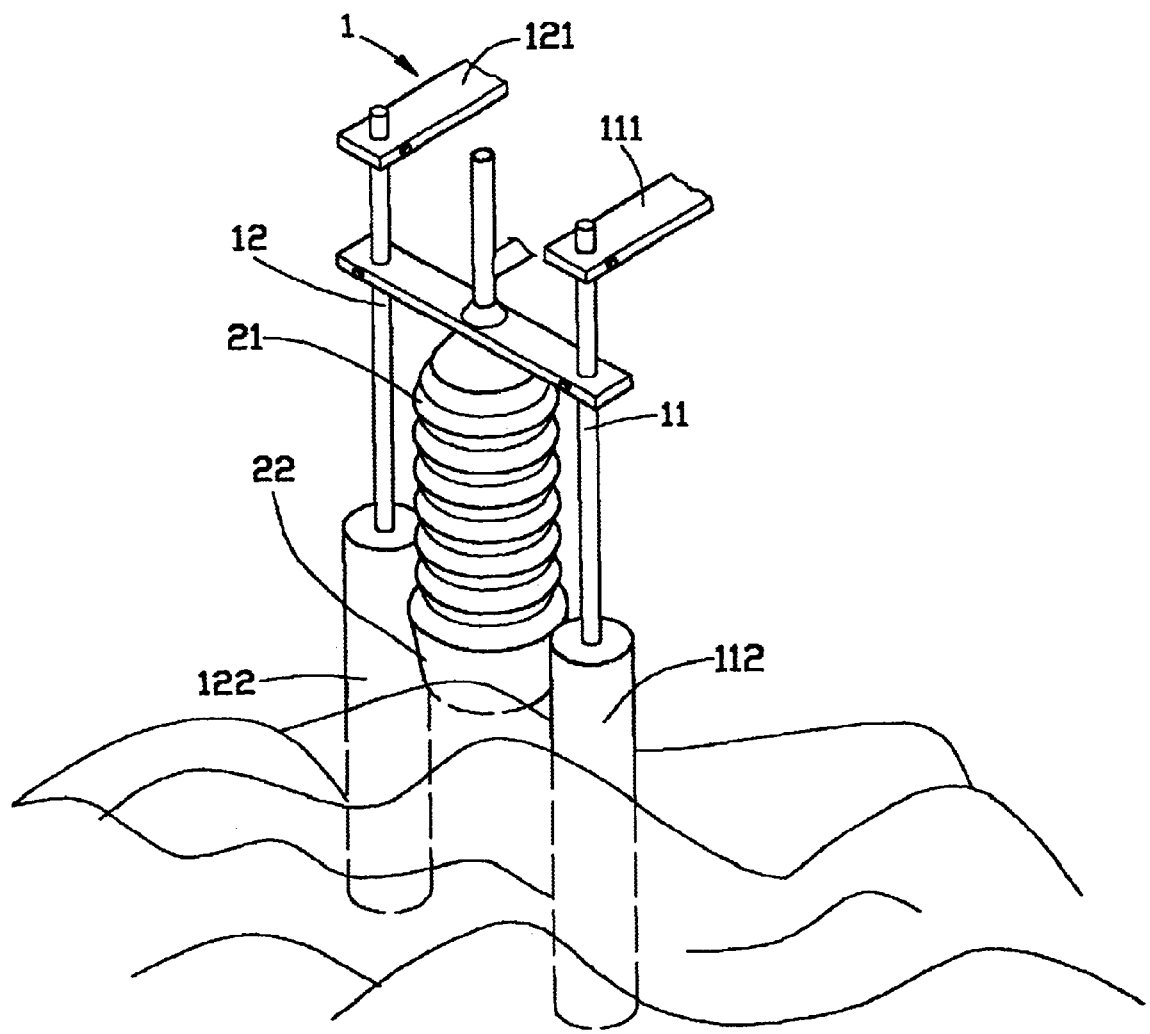
FIG. 4 is a second embodiment of the present invention.

With reference to FIG. 4, the embodiment shows that a first secondary buoy 112 is mounted at the other end of the first support 11 relative to the first reinforced arm 111 and a second secondary buoy 122 is mounted at the other end of the second support 12 relative to the second reinforced arm 121. The first secondary buoy 112 is heavier than that of the buoy 22 and the second secondary buoy 122 is also heavier than that of the buoy 22 so that after the first and second secondary buoys 112,122 are respectively mounted at the other end of the first and second supports 11,12, a part of the first and second secondary buoys 112,122 are immersed in the sea, but the buoy 22 is still flush with the sea level. Therefore, the buoy 22 is still able to provide force to the bellows 21 to drive the bellows 21 to reciprocally move and then reach the purpose of pumping air into the tank 31. It is noted that this embodiment is suitable to areas where the tide difference is large.

Figure 5:
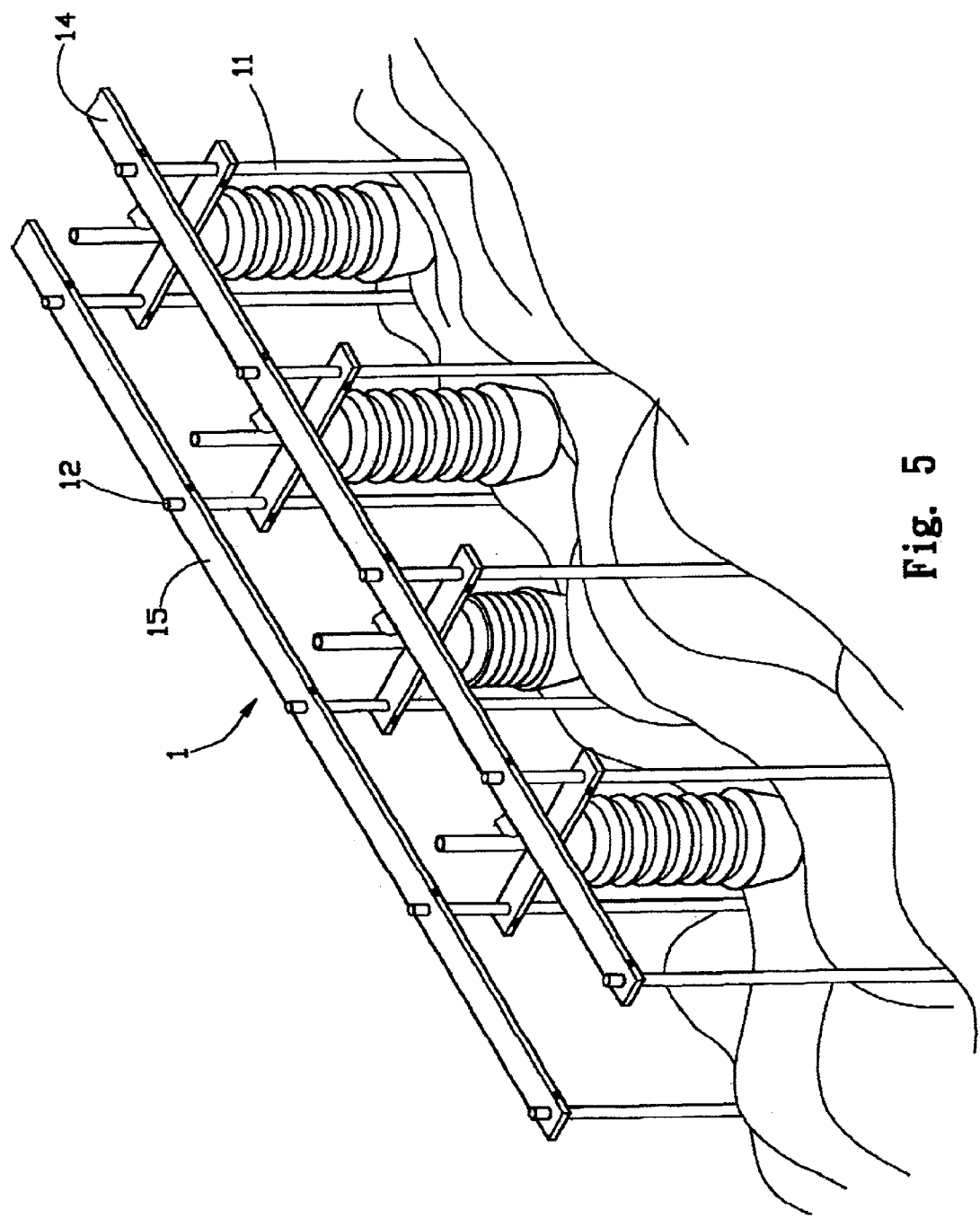
FIG. 5 is a third embodiment of the present invention.

With reference to FIG. 5, it is to be noted that a first auxiliary plate 14 is provided to connect all the first supports 11 and a second auxiliary plate 15 is provided to connect all the second supports 12 so that the force by the bellows 21 can be evenly produced to drive the air flow to the tank 31.

Figure 6:
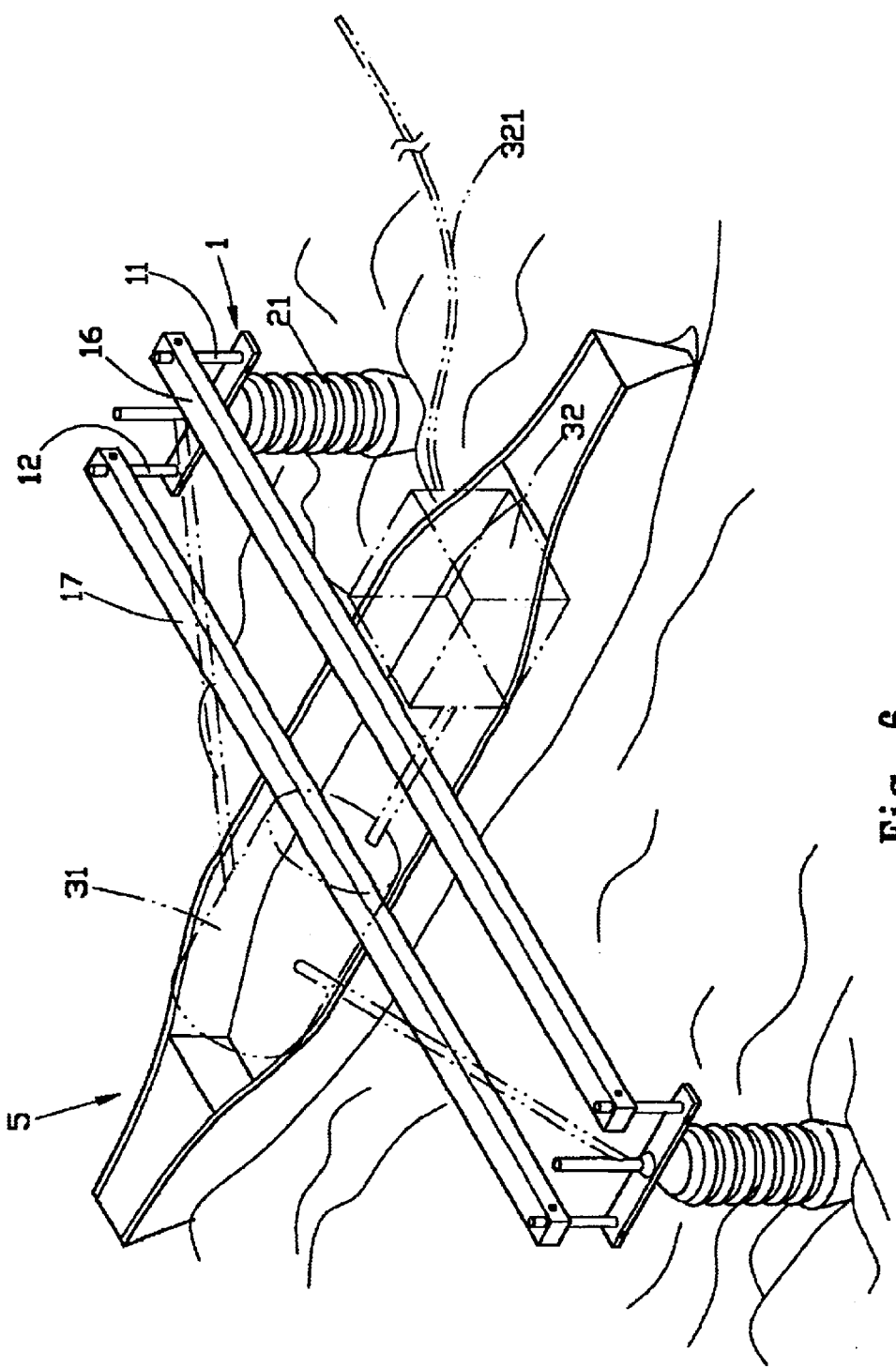
FIG. 6 is a fourth embodiment of the present invention.

With reference to FIG. 6, it is to be noted that a third auxiliary plate 16 is provided to connect all the first supports 11 and a fourth auxiliary plate 17 is provided to connect all the second supports 12. Beside the third and fourth auxiliary plates 16,17, a boat 5 is provided between bellows 21 and has the power generating device 3 mounted on the boat 5 and provided with cables 321 so that electricity from the pneumatic generator 32 is able to be transmitted ashore. One of the best advantage in this embodiment is that the boat 5 is able to sail back to the harbor when there is a storm so that equipment on the boat is protected.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power generating machine adaptable to sea waves so as to generating electricity, the power generating machine comprising:

a frame provided with a first support, a second support and a third support laterally and adjustably mounted between the first and second supports;

a bellows mounted under the third support and between the first and second supports, the bellows having a buoy mounted at a bottom of the bellows to adapt to be flush with sea level so that sea waves are able to drive the bellows to move up and down reciprocally;

a first tube mounted on top of the bellows to communicate with an interior of the first tube and having a first unidirectional valve so as to allow air to be sucked in the first tube when the bellows extend;

a second tube connected to and communicated with the first tube and having a second unidirectional valve so as to allow air flowing only to a tank connected to and communicating with the second tube; and a power generating device having a pneumatic generator connected to the tank so that the pneumatic generator is able to be driven to generate electricity by air pressure built up in the tank.

2. The power generating machine as claimed in claim 1 further comprising a first reinforced arm securely extending from one distal end of the first support so as to be securely fixed on ground and being vertical to the first support and a second reinforced arm securely extending from one distal end of the second support and being vertical to the second support so as to be securely fixed on the ground to strengthen the frame.

3. The power generating machine as claimed in claim 2 further comprising a first secondary buoy mounted at the other end of the first support relative to the first reinforced arm and a second secondary buoy mounted at the other end of the second support relative to the second reinforced arm, wherein the first and second secondary buoys are heavier than that of the buoy so that the buoy is able to adapt to sea waves and functioning normally.

4. The power generating machine as claimed in claim 1 further comprising a spring mounted in the bellows so as to provide a recoil force to the bellows to assist the bellows to move.

5. The power generating machine as claimed in claim 2 further comprising a spring mounted in the bellows so as to provide a recoil force to the bellows to assist the bellows to move.

6. The power generating machine as claimed in claim 3 further comprising a spring mounted in the bellows so as to provide a recoil force to the bellows to assist the bellows to move.

7. The power generating machine as claimed in claim 1 further comprising a boat mounted between the first and second supports and having the power generating device mounted thereon and cables extending out from the pneumatic generator so that electricity is able to be transmitted outward.

8. The power generating machine as claimed in claim 2 further comprising a boat mounted between the first and second supports and having the power generating device mounted thereon and cables extending out from the pneumatic generator so that electricity is able to be transmitted outward.

9. The power generating machine as claimed in claim 3 further comprising a boat mounted between the first and second supports and having the power generating device mounted thereon and cables extending out from the pneumatic generator so that electricity is able to be transmitted outward.

10. The power generating machine as claimed in claim 4 further comprising a boat mounted between the first and second supports and having the power generating device mounted thereon and cables extending out from the pneumatic generator so that electricity is able to be transmitted outward.

11. The power generating machine as claimed in claim 6 further comprising a boat mounted between the first and second supports and having the power generating device mounted thereon and cables extending out from the pneumatic generator so that electricity is able to be transmitted outward.

* * * * *